(12) United States Patent
Nakajima et al.

(10) Patent No.: US 8,548,392 B2
(45) Date of Patent: *Oct. 1, 2013

(54) COMMUNICATION DEVICE

(75) Inventors: Tetsu Nakajima, Yokohama (JP);
Tomoko Adachi, Tokyo (JP); Kiyoshi Toshimitsu, Tokyo (JP); Tatsuma Hirano, Tokyo (JP); Yoriko Utsunomiya, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/588,421

(22) Filed: Aug. 17, 2012

(65) Prior Publication Data

US 2012/0315962 A1    Dec. 13, 2012

Related U.S. Application Data

(63) Continuation of application No. 13/326,714, filed on Dec. 15, 2011, now Pat. No. 8,271,059, which is a continuation of application No. PCT/JP2009/002717, filed on Jun. 16, 2009.

(51) Int. Cl.
*H04B 1/38* (2006.01)
(52) U.S. Cl.
USPC ............. 455/73; 455/25; 455/101; 455/272; 455/450; 370/318; 370/338; 370/329
(58) Field of Classification Search
USPC ............. 455/25, 101, 272, 450, 73; 370/318, 370/338, 329
See application file for complete search history.

(56) References Cited

U.S. PATENT DOCUMENTS

| 7,760,694 B2 * | 7/2010 | Cheung et al. ............... 370/338 |
| 7,894,389 B2 * | 2/2011 | Hyon et al. .................. 370/329 |
| 2002/0132581 A1 * | 9/2002 | Ichihara ........................ 455/25 |
| 2007/0086370 A1 * | 4/2007 | Jang et al. .................... 370/318 |

FOREIGN PATENT DOCUMENTS

| JP | 2004-297750 A | 10/2004 |
| JP | 2008-211372 A | 9/2008 |
| JP | 4163698 B2 | 10/2008 |
| JP | 2009-060620 A | 3/2009 |
| WO | WO 2007/046620 A1 | 3/2009 |

OTHER PUBLICATIONS

IEEE; Amendment 8: Medium Access Control Quality of Service Enhancements; 2005; STD. 802.11e; Chapter 9.9.2; pp. 85-92.
International Search Report dated Oct. 6, 2009 (in English) in counterpart International Application No. PCT/JP2009/002717.
Japanese Office Action drafted Nov. 19, 2012 (and English translation thereof) in counterpart Japanese Application No. 2011-519296.

* cited by examiner

*Primary Examiner* — April G Gonzales
(74) *Attorney, Agent, or Firm* — Holtz, Holtz, Goodman & Chick, PC

(57) ABSTRACT

A communication device includes a receiver, a transmitter and an interruption module. The receiver receives an allocation signal indicating a first period usable by the communication device and a second period usable by a plurality of communication devices including the communication device. The transmitter transmits a transmission signal in the first period. If the transmission of the transmission signal is completed within the first period, the interruption module interrupts at least a part of power supply to the receiver in the second period. If the transmission of the transmission signal is not completed within the first period and directivity of radio waves used by a second communication device includes a direction of the communication device in a communication period allocated before the second period, the transmitter transmits the transmission signal in the second period.

20 Claims, 7 Drawing Sheets

COMMUNICATION DEVICE

This is a Continuation application of U.S. application Ser. No. 13/326,714, filed Dec. 15, 2011, now U.S. Pat. No. 8,271,059 which is Continuation application of PCT Application No. PCT/JP2009/002717, filed Jun. 16, 2009, which was published under PCT Article 21(2) in Japanese, the entire contents of both of which are incorporated herein by reference.

FIELD

Embodiments described herein relate generally to a communication device.

BACKGROUND

An access point may allocate "a period in which a terminal can transmit a signal without conflicting with other terminals (noncompetition period)" to each terminal (scheduling), and each terminal may be activated in the noncompetition period which is allocated to the corresponding terminal. Further, an access point may allocate a dedicated period for retransmitting traffic of which the delay permission period is equal to or less than a threshold value to each terminal.

However, since "the period in which the terminal can transmit a signal" (communication period) is set in advance by the access point, according to the degree of degradation of the propagation environment, the communication period may expire before each terminal retransmits the signal that the terminal has failed to transmit. In this case, QoS (Quality of Service) requirements may not be satisfied. On the other hand, if it is assumed that the access point dynamically allocates the communication period to each terminal, it is necessary for the terminal to await the signal for being allocated the communication period, and power consumption may not be reduced.

BRIEF DESCRIPTION OF THE SEVERAL VIEWS OF THE DRAWINGS

A general configuration that implements the various features of the invention will be described with reference to the drawings. The drawings and the associated descriptions are provided to illustrate embodiments of the invention and not to limit the scope of the invention.

DETAILED DESCRIPTION

In general, according to one embodiment, a communication device includes a receiver, a transmitter and an interruption module. In the communication device, power consumption when the communication device is not awaiting a signal is smaller than power consumption when the communication device awaits the signal. The receiver is configured to receive an allocation signal indicating a first period and a second period, the first period being usable by the communication device, the second period being usable by a plurality of communication devices including the communication device and allocated after the first period. The transmitter is configured to transmit a transmission signal in the first period. The interruption module is configured to interrupt at least a part of power supply to the receiver for a period in which the communication device does not await the signal. The allocation signal is transmitted by a second communication device. If the transmission of the transmission signal is completed within the first period, the interruption module interrupts at least a part of power supply to the receiver in the second period. If the transmission of the transmission signal is not completed within the first period and directivity of radio waves used by the second communication device includes a direction of the communication device in a communication period allocated before the second period, the transmitter transmits a transmission signal in the second period. If the transmission of the transmission signal is not completed within the first period and the directivity of the radio waves used by the second communication device does not include the direction of the communication device in the communication period allocated before the second period, the interruption module interrupts at least a part of the power supply to the receiver in the second period.

Hereinafter, exemplary embodiments will be described exemplifying the wireless LAN standard IEEE 802.11. Further, the following embodiments can be applied to wireless communication systems generally.

First Embodiment

A communication system according to the first embodiment is provided with one access point (hereinafter referred to as a communication device AP) and five communication devices STA1 to STA5. The communication devices AP and STA1 to STA5 perform communication using omnidirectional radio waves. Hereinafter, a case is exemplified in which radio waves transmitted by the communication devices AP and STA1 to STA5 reach all other communication devices. The radio waves transmitted by the communication devices AP and STA1 to STA5 may reach part of other communication devices. The communication device AP gives transmission rights to the communication devices STA1 to STA5 in a central control method (polling method). Further, the access control method in the first embodiment is not limited to that as described above, but may be a distribution control method (CSMA/CA method) or the like.

Figure 1:
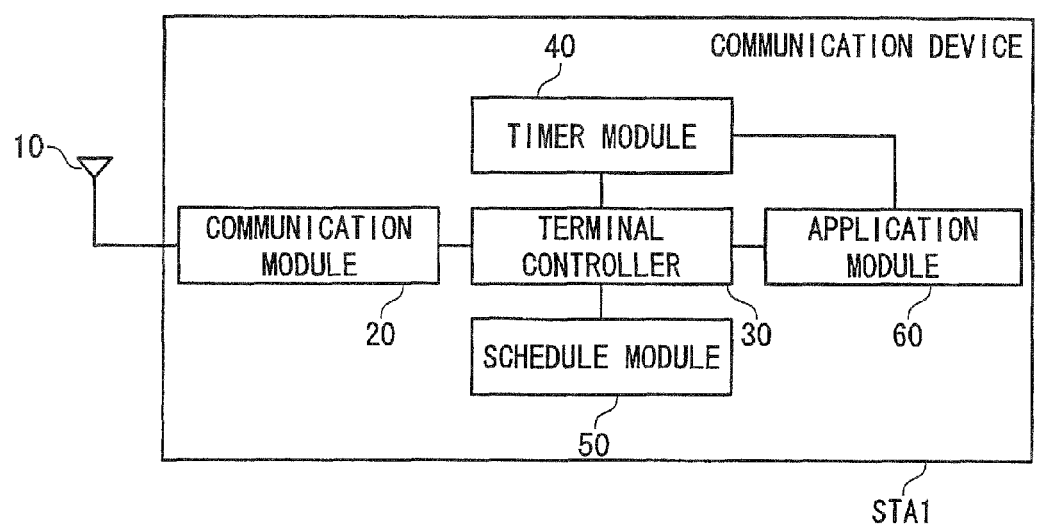
FIG. 1 is an exemplary diagram illustrating a communication device according to a first embodiment.

FIG. 1 is a block diagram illustrating a communication device STAT according to a first embodiment. Further, communication devices AP and STA2 to STA5 are the same. The communication device STA1 includes an antenna 10, a communication module 20, a terminal controller 30, a timer module 40, a schedule module 50, and an application module 60. The communication device STA1 has two operating modes. They are a communication mode in which power consumption is large but a signal (frame) can be received, and a power saving mode in which no frame can be received but power consumption is smaller than that in the communication mode. In the power saving mode, power supply to at least part (at least related to the receiving process) of the communication module 20 may be reduced or stopped. Alternatively, in the power saving, mode, power may be supplied to portions that are required to recognize timer input by the timer module or data generation from the application module as a trigger for shifting from the power saving mode to the communication mode, and to shift to a typical mode while power supply to other portions may be reduced or stopped.

The communication module 20 performs transmission and reception of frames using the antenna 10. The communication module 20 performs a process related to a physical layer such as a frequency conversion process or an A/D conversion process. In the operating mode, the communication module 20 performs transmission, reception, and awaiting of frames.

The terminal controller 30 performs a process related to a MAC layer for wireless communication. The terminal controller 30 controls the operating mode. The terminal controller 30 shifts to the power saving mode when it does not perform transmission, reception, and awaiting of frames. The terminal controller 30 interrupts the power supply to the communication module 20 and the schedule module 50 in the power saving mode. The terminal controller 30 performs a process of an upper layer (except for an application layer) for the wireless communication.

In the power saving mode, the timer module 40 counts time for which the operating mode is changed from the power saving mode to the communication mode. The timer module 40 counts the time when a communication period that is allocated to the local station starts or the time for which an annunciation signal (for example, Beacon signal) is transmitted. In the power saving mode, only the timer module 40 is activated. The annunciation from the timer module 40 triggers the terminal controller 30 to be activated, and the operating mode is shifted from the power saving mode to the communication mode.

The schedule module 50 stores schedule information (a communication period of the local station or each terminal). The schedule information is information that determines a communication period in which one or more communication devices can transmit or receive a signal. In the schedule information, it may be determined whether the communication period is a period in which the communication devices STA1 to STA5 transmit signals to the communication device AP (Uplink), a period in which the communication device AP transmits signals to the communication devices STA1 to STA5 (Downlink), or a time when the communication devices STA1 to STA5 transmit signals to one another (DirectLink). In the schedule information, it may be indicated whether the communication period is a period in which the terminal can transmit a signal with conflicting with other terminals (competition period) or a period in which the terminal can transmit a signal without conflicting with other terminals (noncompetition period).

The schedule information is determined by the communication device AP. The terminal controller 30 reads the schedule information stored in the schedule module 50, and performs a communication process and control of an operating mode. Scheduling is performed by the communication device AP. The communication devices STA1 to STA5 receive the notification of the communication period (schedule information) from the communication device AP.

The application module 60 performs a process related to the application layer. If transmitted data is generated in the application module 60 in the power saving mode, the annunciation from the application module 60 triggers the terminal controller 30 to be activated, and the operating mode is shifted from the power saving mode to the communication mode.

Figure 2:
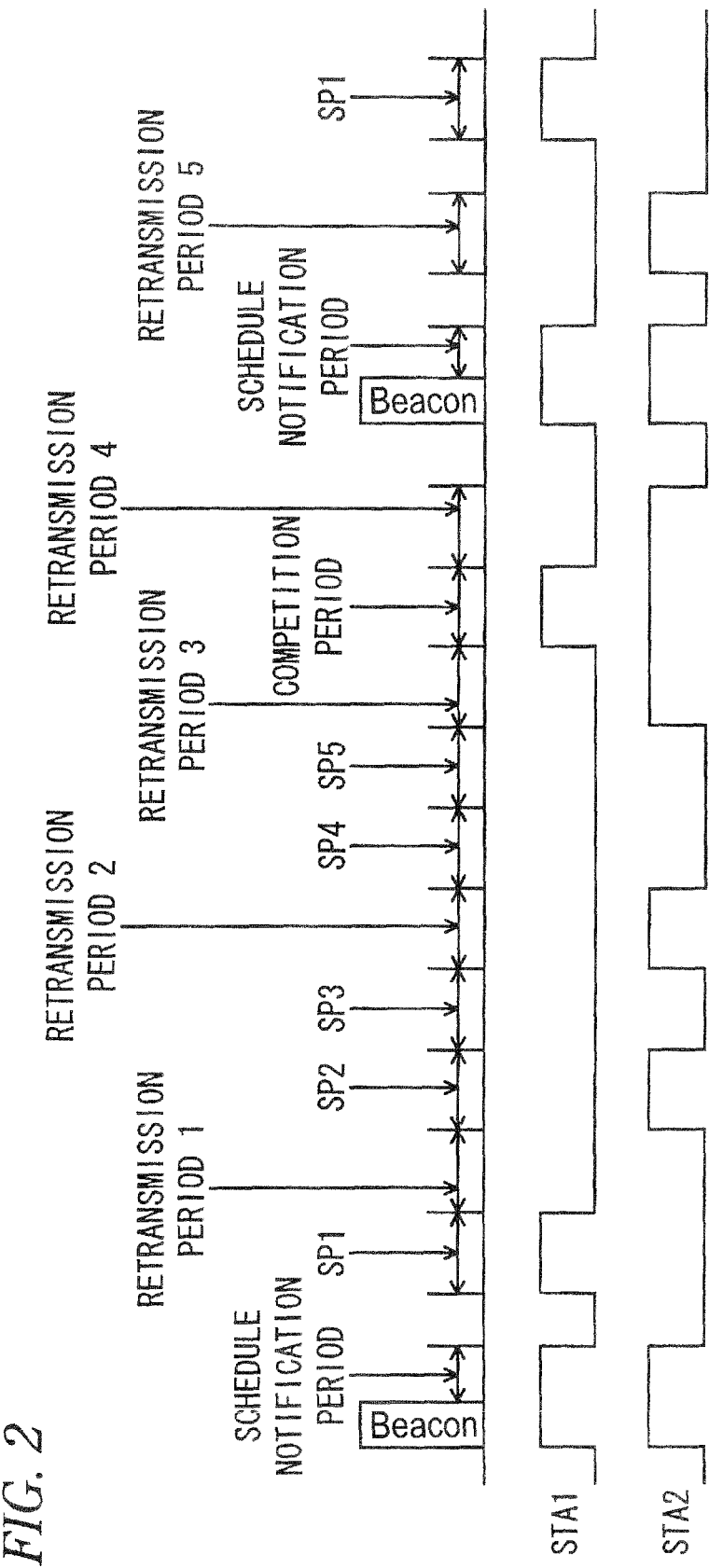
FIG. 2 is an exemplary diagram illustrating schedule information and power consumption of the communication device.

FIG. 2 is a diagram schematically illustrating the schedule information and the temporal change of the power consumption of the communication devices STA1 and STA2. A communication period SPn (n is an integer of 1 to 5) is a communication period allocated to a communication device STAn. In the retransmission periods 1 to 4 and the competition period, all the communication devices STA1 to STA5 can be used. In the retransmission periods 1 to 4, each communication device performs retransmission if the communication is not completed in the communication period SPn allocated to the local station. In the competition period, each communication device may retransmit frames or transmit new frames. In the retransmission periods 1 to 4 and the competition period, each communication device starts transmission of frames after acquiring a transmission right according to an access control method. In the competition period, each communication device acquires the transmission right by CSMA/CA. The schedule information is indicated in the annunciation signal transmitted from the communication device AP or in the schedule signal transmitted in the schedule notification period thereafter.

The period in which the power consumption of the communication devices STA1 and STA2 is large corresponds to the communication mode. The period in which the power consumption of the communication devices STA1 and STA2 is small corresponds to the power saving mode. In the communication mode, the amount of power consumption may slightly differ during transmission, reception, and awaiting. However, in FIG. 2, such slight difference in power consumption is omitted.

In an example of FIG. 2, the communication device STA1 considers that the reception period of the annunciation signal, the following schedule notification period, the communication period SP1 allocated to the local station, and the competition period in which entire communication devices can perform communication correspond to the communication mode, and other periods correspond to the power saving mode. In an example of FIG. 2, the communication device STA2 considers that the reception period of the annunciation signal the following schedule notification period, the communication period SP2 allocated to the local station, the retransmission periods 2, 3, and 4, and the competition period in which entire communication devices can perform communication correspond to the communication mode, and other periods correspond to the power saving mode. Whether or not the communication devices STA1 and STA2 consider that the retransmission periods 1 to 4 correspond to the communication mode is determined according to the communication result in the communication periods SP1 and SP2.

Figure 3:
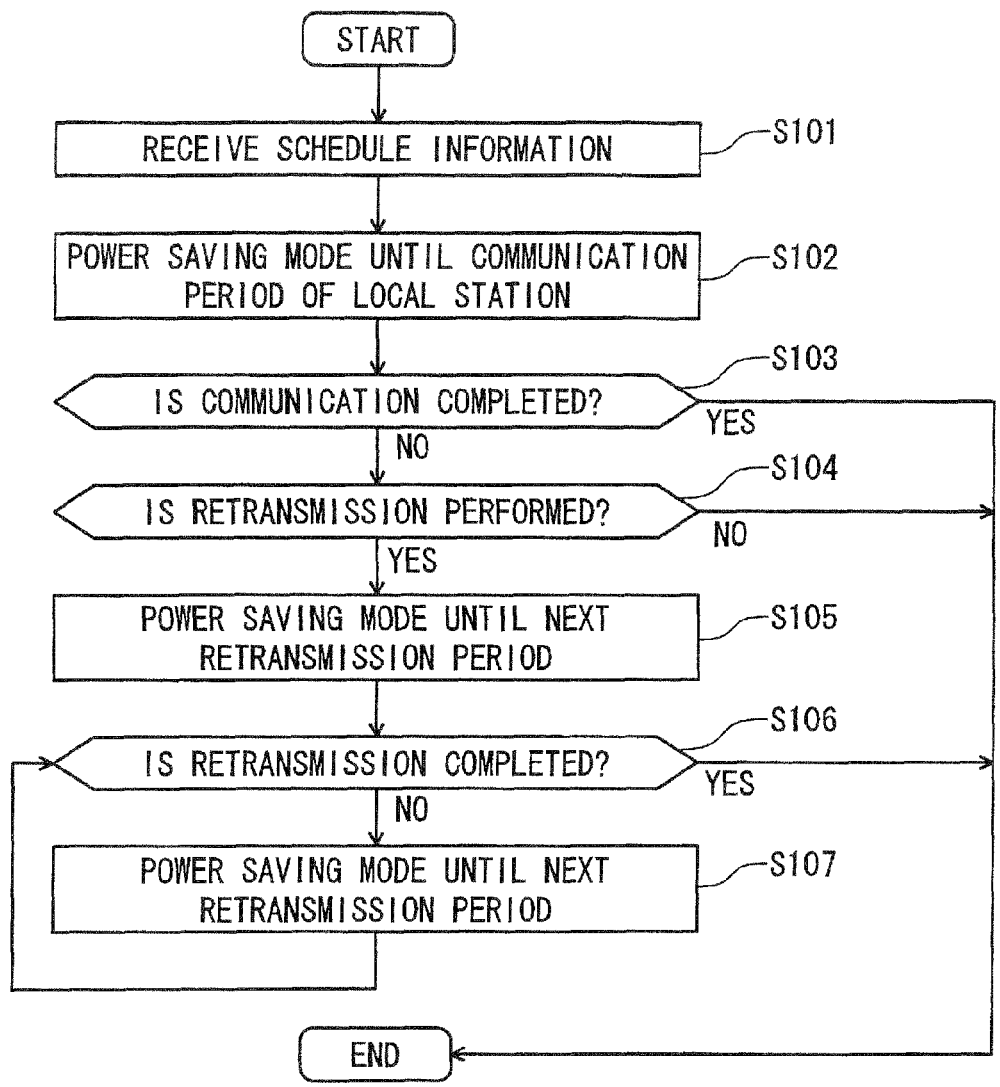
FIG. 3 is an exemplary flowchart illustrating the operation of the communication device according to the first embodiment.

FIG. 3 is a flowchart illustrating the operation of the communication devices STA1 and STA2. First, after an initial start, the communication devices STA1 to STA5 perform connection setting, such as an authentication process or association process, with the communication device AP. After the connection setting, the communication device STA1 awaits and receives the annunciation signal from the communication device AP. The communication device STA1 performs a synchronization process or the like in accordance with the information indicated in the annunciation signal.

Next, the communication device STA1 receives the schedule information from the communication device AP (step S101). In the schedule notification period, the communication device STA1 receives the schedule signal (schedule information) from the communication device AP. The schedule signal that is received by the communication device STA1 during the schedule notification period may correspond to plural frames. The communication device STA1 may receive the annunciation signal in which the schedule information is indicated rather than receiving the schedule signal. The schedule module 50 of the communication device STA1 stores the schedule information. The allocation result of the communication periods of the respective communication devices STA1 to STA5 (schedule information) is generated by the communication device AP. Information that is required for the communication device AP to perform scheduling, for example, band information, data communication amount, and delay permission time, which are required for the application of the communication device STA1, may be notified to the communication device AP in advance.

Next, the terminal controller 30 of the communication device STA1 is in the power saving mode for a certain time before the start time of the communication period SP1 of the local station (step S102). If the communication device STA1 is in the power saving mode, the timer module 40 counts the period for the certain period before the start time of the communication period SP1. The timer 40 may count a period that is shorter than the start time of the communication period SP1 for a period that is required for preparation of the communication (preparation period). If the count is finished, the timer module 40 activates the terminal controller 30. After the activation, the terminal controller 30 is shifted to the communication mode. The terminal controller 30 reads the schedule information from the schedule module 50. Since the terminal controller 30 performs transmission/reception of the frames in the communication period SP1, it activates the communication module 20. The terminal controller 30 may activate the application module 60 when it transmits the frames in the communication period SP1.

Next, the communication device STA1 transmits or receives the frames in the communication periods SP1. Then, the communication device STA1 determines whether or not the communication of the frames is completed in the communication period SP1 (step S103).

In the case of receiving the frames from the communication device AP, the terminal controller 30 of the communication device STA1 determines whether or not to perform the retransmission process from the result of reception of the frames. The terminal controller 30 determines if the communication is completed when the retransmission does not occur. The terminal controller 30 determines if the communication is not completed when the retransmission occurs.

In the case of transmitting the frames to the communication device AP, the terminal controller 30 of the communication device STA1 determines whether or not to perform the retransmission process from an acknowledgement frame from the communication device AP. The terminal controller 30 determines whether or not the retransmission process is performed and whether or not the communication is completed according to the amount of transmitted data accumulated in the application module 60.

Here, the communication device STA1 considers that the communication of the frames is completed in the communication period SP1 ("Yes" in step S103). Since the communication of the frames is completed in the communication period SP1, the communication device STA1 is in the power saving mode in the retransmission periods 1, 2, 3, and 4. The communication device STA1 is in the communication mode in the competition period in which it can transmit new frames. Thereafter, the communication device STA1 becomes in the communication mode in the communication period in which the local station performs communication, and becomes in a low power consumption mode in a period except for the communication period in which the local station performs communication. The above-described operation is repeated. The communication period in which the local station performs communication, for example, may be the competition period, the communication period of the annunciation signal, the schedule notification period, the communication period allocated to the local station, the retransmission period in the case where the communication of the frames is not completed in the communication period, or the like.

As described above, the communication device STA1 performs communication in the communication period SP1 allocated to the local station, and if the retransmission process is unnecessary, it does not activate the retransmission period, but becomes in the power saving mode to reduce the power consumption.

Next, using FIGS. 2 and 3, the operation of the communication device STA2 will be described. The steps S101 and S102 are the same. Here, it is assumed that the terminal controller 30 of the communication device STA2 determines that the communication of the frames is not completed in the communication period SP2 ("No" in step S103).

Next, the terminal controller 30 of the communication device STA2 determines whether or not the retransmission process is performed using the retransmission period before the communication period SP2 next allocated to the local station or the competition period in accordance with the annunciation signal or the schedule signal (step S104). In the case where the communication of the frames is not completed in the communication period SP2, the terminal controller 30 of the communication device STA2 may determine that the retransmission process using the retransmission period is performed. In the case where the remaining time of the delay permission time of the frame is equal to or smaller than a threshold value, as the case where the communication of the frames is not completed in the communication period SP2, the terminal controller 30 may determine that the retransmission process using the retransmission period is performed. This threshold value may be a period up to the start time or end time of the next communication period SP2. Here, it is assumed that the communication device STA2 determines that the retransmission process is performed using the retransmission period ("Yes" in step S104).

Next, the terminal controller 30 of the communication device STA2 becomes in the power saving mode for a certain time before the start time of the retransmission period 2 (step S105). If the count performed by the timer module 40 is finished, the terminal controller 30 is shifted to the communication mode. Then, the communication device STA2 receives the polling signal from the communication device AP or acquires the transmission right through the CSMA/CA, and then performs the retransmission process using the retransmission period 2.

In an example of FIG. 2, the communication device STA2 becomes in the communication mode in the retransmission periods 2 to 5 and the competition period since the retransmission is not completed even by using the retransmission periods 2 to 4 and the competition period ("NO" in step 106). Thereafter, the communication device STA2 is in the communication mode in the communication period in which the local station performs communication, and is in the low power consumption mode in the period except for the communication period in which the local station performs communication. This operation is repeated.

Whenever it is determined that the retransmission is not completed ("No" in S106) in a state where the respective retransmission periods 2 to 5 are finished, the terminal controller 30 of the communication device STA2 may determine whether or not the retransmission process is attempted using the next retransmission period. If the time that elapses from the end time of the communication period SP2 does not exceed the delay permission time, the terminal controller 30 may determine that the retransmission process using the retransmission period is performed.

As described above, even in the case where the retransmission process occurs due to the deterioration of the wireless propagation environment or the occurrence of a data transmission request of the application and the transmission of the frames is not completed in the communication period SP2 pre-allocated by the communication device AP, the communication device STA2 can perform the timely retransmission process as reducing the power consumption.

Modified Example 1

Since the communication devices STA1 to STA5 and AP according to the first embodiment maintain the connection when a period in which the communication is not temporarily performed occurs, they can communicate the annunciation signal and a management frame (management signal). The communication devices STA1 to STA5 and AP communicate with a communication partner after performing a connection process such as an authentication process. Thereafter, in the case where the communication is not temporarily performed, the communication devices STA1 to STA5 and AP perform a synchronization process by the annunciation signal and confirmation of the communication maintenance by the management signal at an interval in order to maintain the connection state with the communication partner. The communication devices STA1 to STA5 become in the communication mode when communicating the annunciation signal and the management signal, and become in the power saving mode in other periods.

Figure 5:
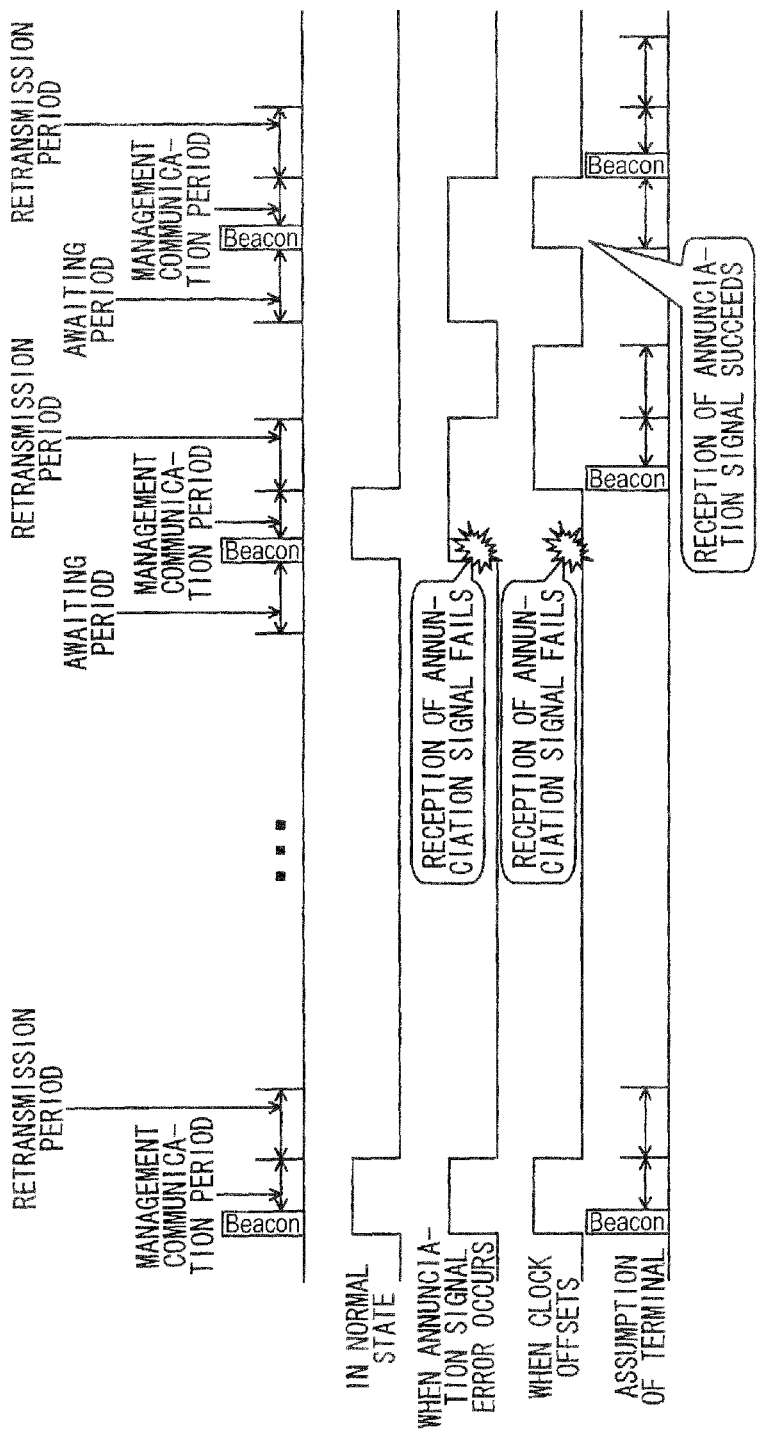
FIG. 5 is a diagram illustrating schedule information and power consumption of the communication device.

FIG. 5 is a diagram schematically illustrating schedule information and the temporal change of power consumption of a communication device STA1. FIG. 5 shows the power consumption of the communication device STA1 in the case of a normal state (in the case where reception of all the annunciation signal and the management signal has succeeded), in the case where an error occurs (in the case where reception of the annunciation signal and the management signal has failed), and in the case where the clock offsets (in the case where the annunciation signal is unable to be received in the timing that is assumed by the terminal).

Unlike the first embodiment, after the communication period of the annunciation signal, a management communication period is allocated rather than the schedule notification period. The management communication period is a period in which the communication devices STA1 to STA5 and AP communicate the management signal. The retransmission period is a period in which the communication devices STA1 to STA5 and AP retransmit the management signal. The awaiting period is a period in which the communication devices STA1 to STA5 await to receive the next annunciation signal if the communication devices STA1 to STA5 have failed to receive the annunciation signal.

Figure 4:
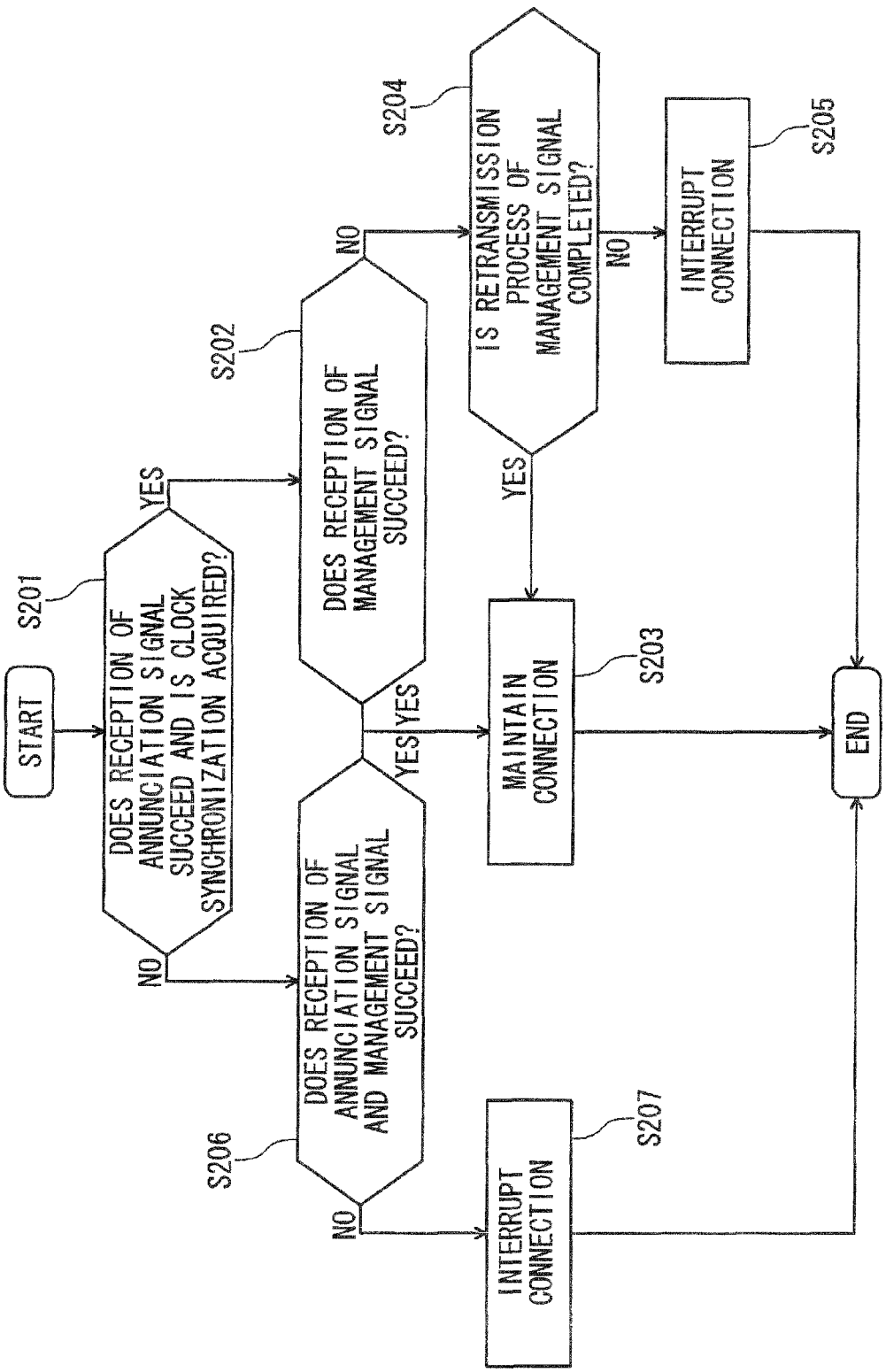
FIG. 4 is an exemplary flowchart illustrating the operation of the communication device according to a modified example 1 of the first embodiment.

FIG. 4 is a flowchart illustrating the operation of a communication device STA1. The communication device STA1 performs a clock synchronization process through reception of the annunciation signal, and maintains the connection through exchange of the management signal.

(In a normal state) In the case where the reception of the annunciation signal from the communication device AP has succeeded ("Yes" in step S201), and in the case where the reception of the management signal has succeeded ("Yes" in step S202), the connection state between the communication device STA1 and the communication partner is maintained (step S203). As indicated as "in a normal state" in FIG. 5, the terminal controller 30 of the communication device STA1 becomes in the communication mode in the annunciation signal reception period and in the management communication period, and becomes in the power saving mode in other periods.

(When a management signal error occurs) In the case where the reception of the annunciation signal from the communication device AP has succeeded ("Yes" in step S201), and in the case where the reception of the management signal has failed ("No" in step S202), the communication device STA1 attempts to receive the management signal in the retransmission period that is allocated after the management communication period (step S204). If the reception of the management signal has succeeded in the retransmission period ("Yes" in step S204), the connection state between the communication device STA1 and the communication partner is maintained (step S203). On the other hand, if the reception of the management signal has failed in the retransmission period ("No" in step S204), the connection state between the communication device STA1 and the communication partner is cut off (step S205). If the reception failure of the management signal in the management communication period and in the retransmission period is repeated several times (or continues in a certain period), the connection state between the communication device STA1 and the communication partner may be cut off. The terminal controller 30 of the communication device STA1 becomes in the communication mode in the annunciation signal reception period, in the management communication period, and in the retransmission period, and becomes in the power saving mode in other periods.

(When an annunciation signal error occurs) In the ease where the reception of the annunciation signal from the communication device AP has failed ("No" in step S201), the communication device STA1 becomes in the communication mode from the awaiting period that is allocated before the communication period of the next annunciation signal to await the signal, and attempt to receive the next annunciation signal (step S206). If the reception of the annunciation signal and the management signal has succeeded in the awaiting period or the like ("Yes" in step S206), the connection state between the communication device STA1 and the communication partner is maintained (step S203). On the other hand, if the annunciation signal is unable to be received in the awaiting period or the like ("No" in step S206), the connection state between the communication device STA1 and the communication partner is cut off (step S207). If the reception failure of the annunciation signal in the awaiting period and in the communication period of the annunciation signal is repeated several times (or continues in a certain period), the connection state between the communication device STA1 and the communication partner may be cut off. In this case, the communication device STA1 considers that the communication with the communication partner is not possible, and discards the connection information such as authentication information and association information. As indicated as "when an annunciation signal error occurs" in FIG. 5, the terminal controller 30 of the communication device STA1 becomes in the communication mode in the annunciation signal reception period, in the management communication period, and in the awaiting period after the reception of the annunciation signal fails, and becomes in the power saving mode in other periods. Further, "when the annunciation signal error occurs" in FIG. 5, it is exemplified that the communication device STA1 fails to receive the management signal and becomes in the communication mode even in the retransmission period.

(When the clock offsets) Although the annunciation signal is transmitted at an interval by the communication device AP, there may be deviations in the measurement result of duration in the communication devices STA1 to STA5 and the communication device AP. The timing that is assumed by the communication device STA1 as the communication period of the annunciation signal appears as the annunciation signal surrounded by a dashed line in the "assumption of the terminal" in FIG. 5. The timing in which the communication device AP actually transmits the annunciation signal appears as the annunciation signal surrounded by a solid line in FIG. 5. In the communication period of the first annunciation signal, clocks of the communication devices STA1 and AP coincide with each other, and the communication device STA1 succeeds to receive the annunciation signal. In the communication period of the second annunciation signal, the communication period of the annunciation signal assumed by the communication device STA1 is significantly slower than the communication period of the actual annunciation signal. Because of this, since the communication device STA1 is in the power saving mode in the period in which the annunciation signal is transmitted by the communication device AP, it fails to receive the annunciation signal ("No" in step S201). Next, in the same manner as (when the annunciation signal error occurs), the communication device STA1 becomes in the communication mode from the awaiting period that is allocated before the communication period of the next annunciation signal to await, and attempts to receive the next annunciation signal (step S206).

By doing so, even if the clocks of the communication device STA1 and the communication device AP offset each other, the communication device STA1 awaits the signal in the communication period of the third annunciation signal in FIG. 5. Accordingly, the communication device STA1 can normally receive the annunciation signal as reducing the power consumption, and can perform the clock synchronization process.

Modified Example 2

It may be assumed that in the case where the communication is not completed in the periods SP1 to SP5 allocated to the local station, the communication devices STA1 to STA5 according to the first embodiment perform the retransmission using only the retransmission period selected among the retransmission periods 1 to 4.

Figure 6:
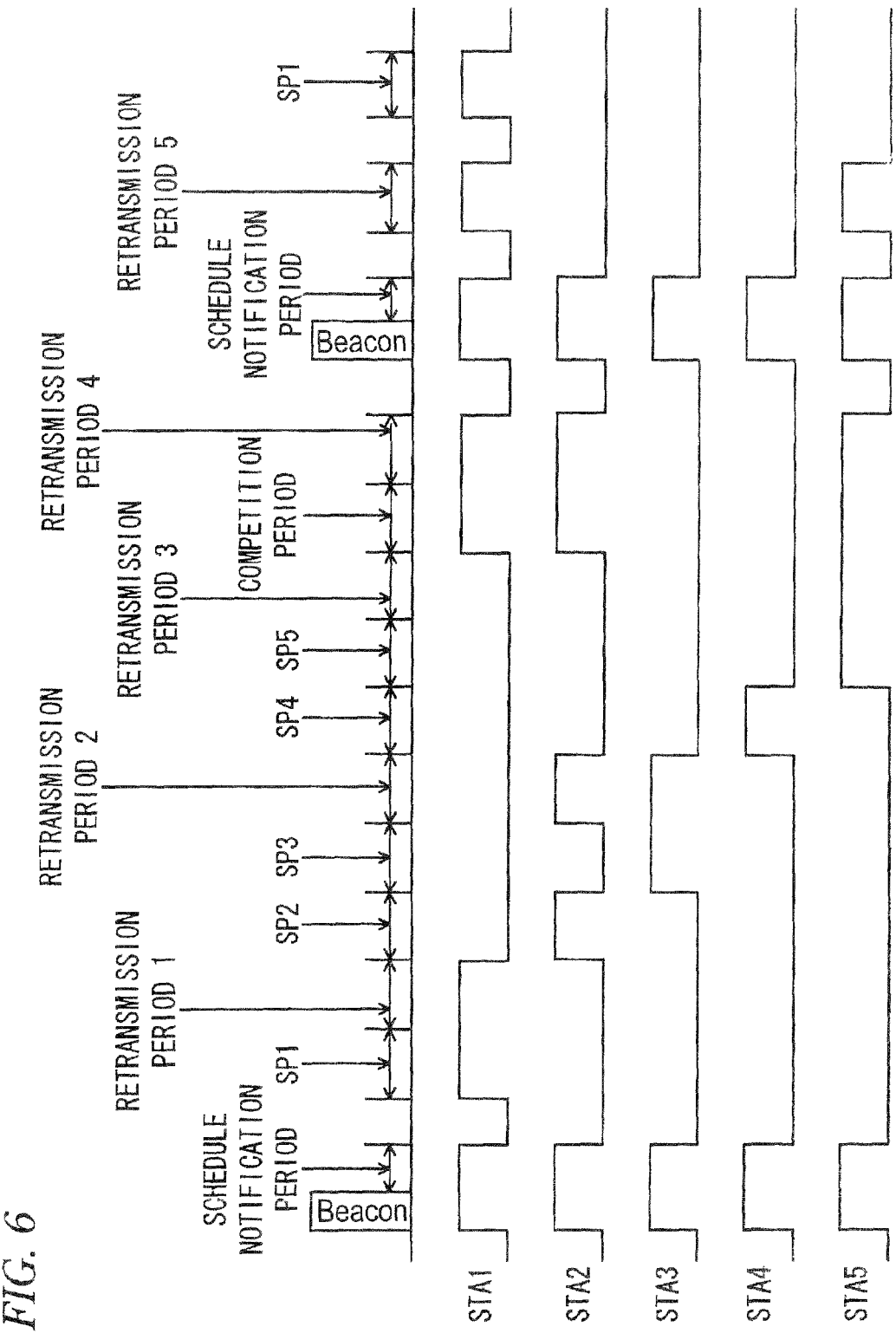
FIG. 6 is a diagram illustrating schedule information and power consumption of the communication device.

FIG. 6 is a diagram schematically illustrating schedule information and the temporal change of the power consumption of the communication devices STA1 to STA5. The schedule information shown in FIG. 6 is the same as the schedule information (FIG. 2) according to the first embodiment.

After receiving the schedule information (step 101 in FIG. 3), the terminal controller 30 of the communication devices STA1 to STA5 selects a candidate of the retransmission period that is used in retransmitting the frames among the retransmission periods 1 to 5. The terminal controller 30 of the communication devices STA1 to STA5 selects the retransmission period that is allocated in the earliest after the communication periods SP1 to SP5 allocated to the local station as a candidate of the retransmission period that is used in transmitting frames. The terminal controller 30 of the communication devices STA1 to STA5 selects the retransmission period that is allocated just after the competition period as a candidate of the retransmission period that is used in transmitting the frames. The terminal controller 30 of the communication device STA1 to STA5 selects the competition period as a candidate of the retransmission period that is used in transmitting the frames.

The retransmission period 1 is used by the communication device STA1 to retransmit the frames under the access control in a polling method in the case where the communication device STA1 has not completed the communication in the communication period SP1. In the retransmission period 1, the communication devices STA2 to STA4 are in the power saving mode.

The retransmission period 2 is used by the communication devices STA2 and STA3 to retransmit the frames under the access control in a polling method in the case where the communication devices STA2 and STA3 have not completed the communication in the communication periods SP2 and SP3. In the retransmission period 2, the communication devices STA1, STA4, and STA5 are in the power saving mode.

The retransmission period 3 is used by the communication devices STA4 and STA5 to retransmit the frames under the access control in a polling method in the case where the communication devices STA4 and STA5 have not completed the communication in the communication periods SP4 and SP5 (FIG. 6 shows an example in which the communication device STA4 has completed the communication in the communication period SP4). In the retransmission period 3, the communication devices STA1 to STA4 are in the power saving mode.

The competition period is used by the communication devices that have not completed the communication (in an example of FIG. 6, STA1, STA2, and STA5) to retransmit the frames under the access control in the CSMA/CA method regardless of the communication period allocated to the local station and the use of the retransmission period. In the competition period, the communication devices STA3 and STA4 are in the power saving mode.

The retransmission period 4 is a retransmission period that is allocated just after the competition period. The retransmission period 4 is used by the communication devices that have not completed the communication in the communication period allocated to the local station, the retransmission period, and the competition period (in an example of FIG. 6, STA1, STA2, and STA5) to retransmit the frames under the access control in the polling method. In the retransmission period 4, the communication devices STA3 and STA4 are in the power saving mode.

The retransmission period 5 is a retransmission period that is allocated before the communication period which is allocated from the next schedule information to each communication terminal after the next annunciation signal is transmitted. The retransmission period 5 is used by the communication devices that have not completed the communication in the communication period allocated to the local station, the retransmission period, and the competition period (in an example of FIG. 6, STA1 and STA5) to retransmit the frames under the access control in the polling method. In the retransmission period 5, the communication devices STA2 to STA4 are in the power saving mode.

As described above, the terminal controller 30 of the communication devices STA1 to STA5 selects the retransmission period that is used to retransmit the frames among plural retransmission periods 1 to 5 set in the schedule information, and becomes in the operating mode only in the retransmission period, while it becomes in the power saving mode in other retransmission periods. Because of this, even in the case where the retransmission process occurs due to the deterioration of the wireless propagation environment or the occurrence of the data transmission request of the application and the transmission of the frames is not completed in the communication periods SP1 to SP5 pre-allocated by the communication device AP, the communication devices can perform the timely retransmission process as reducing the power consumption. Unless the retransmission of the frames is completed, it is not necessary to activate all the retransmission periods 1 to 5 set in the schedule information so as to be in the communication mode, and thus the amount of power consumption can be reduced.

If the retransmission process is not completed even in the retransmission period set in the schedule information, the retransmission process can be performed by activating in the competition period, and thereafter, the retransmission process can be performed by activating in the retransmission period 4 and the retransmission period 5. By doing so, the retransmission process can be continuously performed until the retransmission process goes over the permission amount of the delay period of the corresponding data.

The terminal controller 30 of the communication devices STA1 to STA5 selects the retransmission period that is allocated in the earliest after the communication periods SP1 to SP5 allocated to the local station as the retransmission period that is used to retransmit frames, and becomes in the operating mode only in the retransmission period while it becomes in the power saving mode in other retransmission periods. Accordingly, the delay occurrence is suppressed to improve the throughput, and the power consumption is reduced.

In the case where the retransmission process of the frames is not completed even in the retransmission period that is allocated in the earliest after the communication periods SP1 to SP5 allocated to the local station, the terminal controller 30 of the communication devices STA1 to STA5 selects the competition period and the retransmission period that is allocated just after the competition period as the retransmission periods that are used to retransmit the frames, and becomes in the operating mode. In the ease where the retransmission process is completed, the terminal controller 30 becomes in the power saving mode in the competition period and the retransmission period that is allocated just after the competition period, and is operated according to the occurrence situation of the retransmission process to reduce the power consumption.

Modified Example 3

In the above-described embodiments, it is assumed that the communication devices STA1 to STA5 and AP perform communication using omnidirectional radio waves. However the communication devices STA1 to STA5 and AP may perform communication using directional radio waves.

Figure 7:
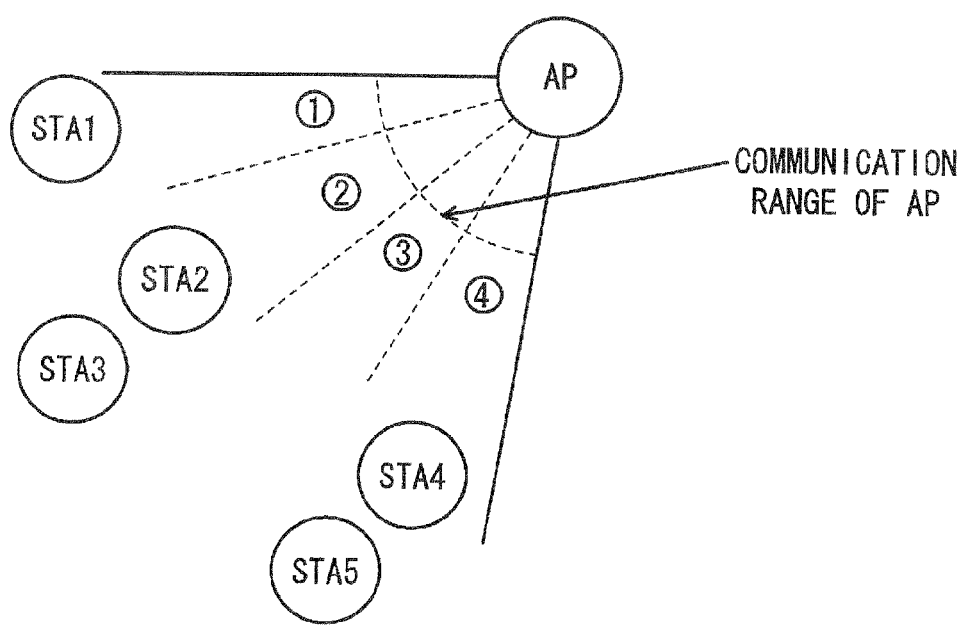
FIG. 7 is a diagram illustrating a communication system according to a modified example 3 of the first embodiment.

FIG. 7 is a diagram illustrating a wireless system according to a modified example 3 of the first embodiment. The wireless communication range of the communication device AP includes STA1 to STA5. The wireless communication range of the communication device AP is divided into four sectors 1 to 4. The communication device AP communicates with the communication device STA1 using the sector 1. The communication device AP communicates with the communication devices STA2 and STA3 using the sector 2. The communication device AP communicates with the communication devices STA4 and STA5 using the sector 4. In the case of an authentication and association process, the communication devices STA1 to STA5 grasp the directivity (for example, sector number) in the local station direction among the directivities of the communication device AP. However, as illustrated in FIG. 7, it is not necessary for the respective sectors to be clearly divided in the physical directions, and communication devices having similar directions may be integrated and managed as one sector.

The communication periods SP1 to SP5 are allocated to the respective communication devices STA1 to STA5 and the directivity of the communication device AP are set as the direction of the communication device to which the communication period is allocated. It is necessary that the retransmission periods 1 to 4, the competition period are allocated, and the directivity of the communication device AP are set as the direction of the communication device that performs communication using the periods.

When receiving the schedule information (step S101 in FIG. 2), the communication devices STA1 to STA5 select the retransmission period to be used depending on whether the directivity of the communication device AP becomes the direction of the local station in any one of retransmission periods 1 to 4 and the competition period.

As an example in which the communication devices STA1 to STA5 select the retransmission period in which the retransmission of the frames is performed according to the method indicated in modified example 2, a scheduling method of the communication device AP will described hereinafter. The communication device AP sets one or more communication devices that perform communication using the same directivity as one group. The communication device AP sets the communication device STA1 as group 1 (directivity: sector 1). The communication device AP sets the communication devices STA2 and STA3 as group 2 (directivity: sector 2). The communication device AP sets the communication devices STA4 and STA5 as group 3 (directivity: sector 4).

The terminal controller 30 of the communication device AP performs the scheduling by allocating a communication period allocated to a communication device that belongs to a group and then setting the retransmission period of the communication device that belongs to the group. For example, the terminal controller 30 allocates the communication period SP1 that is allocated to the communication device STA1 that belongs to the group 1 and then allocates a retransmission period 1 of the communication device STA1 that belongs to the group 1. Next, the terminal controller 30 allocates the communication periods SP2 and SP3 allocated to the communication devices STA2 and STA3 that belong to the group 2 and then allocates a retransmission period 2 of the communication devices STA2 and STA3 that belong to the group 2. Next, the terminal controller 30 allocates the communication periods SP4 and SP5 allocated to the communication devices STA4 and STA5 that belong to the group 3 and then allocates a retransmission period 3 of the communication devices STA4 and STA5 that belong to the group 3. After allocating the communication periods and the retransmission periods with respect to all the groups, the terminal controller 30 allocates the competition period which all the communication devices can use and the retransmission period 4. By doing this, the terminal controller 30 of the communication device AP can perform the scheduling of the communication period, the retransmission period, and the competition period (the same as those in FIGS. 2 and 6).

Then, the communication device AP determines the directivities in the respective retransmission period and the competition period. Since it is possible that the retransmission period 1 is used by the communication device STA1 that belongs to the group 1, the communication device AP determines the directivity in the retransmission period 1 as sector 1. Since it is possible that the retransmission period 2 is used by the communication devices STA2 and STA3 that belong to the group 2, the communication device AP determines the directivity in the retransmission period 2 as sector 2. Since it is possible that the retransmission period 3 is used by the communication devices STA4 and STA5 that belong to the group 3, the communication device AP determines the directivity in the retransmission period 3 as sector 4. Since it is possible that the competition period and the retransmission period 4 are used by all the communication devices STA1 to STA5, the communication device AP determines the directivity in the retransmission period 4 and the competition period as an omnidirection (sectors 1 to 4). By doing this, the terminal controller 30 of the communication device AP performs the scheduling.

Next, the operation of the respective communication devices STA1 to STA5 will be described. The communication devices STA1 to STA5 receive the scheduling information.

In the case where the communication is not completed in the communication periods SP1 to SP5 allocated to the local station, the communication device STA1 to STA5 may select the retransmission period at the earliest after the communication periods SP1 to SP5 as the retransmission period that is used to retransmit the frames.

In the case where the directivity of the communication device AP in the period before (just before) the retransmission period corresponds to the direction of the local station, the communication devices STA1 to STA5 may select the retransmission period as the retransmission period that is used to retransmit the frames. For example, since the directivity of the communication device AP in the communication period SP3 before (just before) the retransmission period 2 corresponds to the direction of the local station, the communication device STA2 selects the retransmission period 2 that is used to retransmit the frames.

In the schedule information, in addition to the information explained in the first embodiment, information on the directivity of the communication device AP at least in the retransmission periods 1 to 4 and the competition period may be indicated. In this case, the communication devices STA1 to STA5 may select and use the period in which the directivity of the communication device AP corresponds to the direction of the local station to retransmit the frames.

As described above, the terminal controller 30 of the communication devices STA1 to STA5 selects the retransmission period that is used to retransmit the frames among the plural retransmission periods 1 to 5 set in the schedule information in accordance with the directivity of the communication device AP, and becomes in the operating mode only in the retransmission period, while it becomes in the power saving mode in other retransmission periods. Because of this, even in the case where the retransmission process occurs due to the deterioration of the wireless propagation environment or the occurrence of the data transmission request of the application and the transmission of the frames is not completed in the communication periods SP1 to SP5 pre-allocated by the communication device AP, the communication devices can perform the timely retransmission process as reducing the power consumption.

The terminal controller 30 of the communication devices STA1 to STA5 selects the retransmission period that is allocated in the earliest after the communication periods SP1 to SP5 allocated to the local station as the retransmission period that is used in retransmitting the frames, and becomes in the operating mode only in the retransmission period while it becomes in the power saving mode in other retransmission periods. Accordingly, the delay occurrence is suppressed to improve the throughput, and the power consumption is reduced.

By selecting the retransmission period in which the directivity of the communication device AP in the communication period before (just before) the retransmission period corresponds to the direction of the local station as the retransmission period that is used to retransmit the frames, the retransmission process can be performed in a timely manner when the communication device AP is in a communicable state even without the directivity information of the retransmission period.

By selecting the period in which the directivity of the communication device AP corresponds to the direction of the local station among the retransmission periods 1 to 4 and the competitive period to use the period in retransmitting the frames, the terminal controller 30 becomes in the power saving mode in the retransmission period in which the directivity of the communication device AP is not directed to the direction of the local station, and thus the power consumption can be reduced without deteriorating the throughput.

Other Embodiments

The embodiments of the invention are not limited to the above-described embodiments, but may be extended and changed, and the extended and changed embodiments are included in the scope of the invention.

While certain embodiments have been described, these embodiments have been presented by way of example only, and are not intended to limit the scope of the invention. Indeed, the novel device described herein may be embodied in a variety of other forms; furthermore, various omissions, substitutions and changes in the form of the device, described herein may be made without departing from the spirit of the invention. The accompanying claims and their equivalents are intended to cover such forms or modifications as would fall within the scope and spirit of the invention

What is claimed is:

1. A communication device comprising:
a communication module configured to receive and transmit signals over radio waves, wherein one of the received signals is an allocation signal indicating a plurality of first periods and a plurality of second periods, each of the plurality of first periods being allocated to one of a plurality of communication devices, and each of the plurality of second periods being useable by the plurality of communication devices; and
a control module configured to:
make a first determination as to which one of the plurality of first periods is allocated to the communication device,
make a second determination as to whether all signals which are to be received, are received, and all signals which are to be transmitted, are transmitted, within the first period which is determined to be allocated to the communication device by the first determination, and
after the first period which is determined to be allocated to the communication device by the first determination, control power supply to the communication module according to the second determination;
wherein the control module is configured to limit the power supply when all signals which are to be received, are received, and all signals which are to be transmitted, are transmitted, within the first period which is determined to be allocated to the communication device by the first determination.

2. The device according to claim 1, wherein:
the control module is further configured to determine whether a synchronization signal whose transmission is scheduled periodically is received by the communication module; and
when the control module determines that the synchronization signal is not received, the control module limits the power supply after the synchronization signal is received by the communication module during a third period which is a period preceding a scheduled timing of receiving the synchronization signal.

3. The device according to claim 2, wherein:
the control module is further configured to determine whether the allocation signal is received by the communication module during a fourth period after the reception of the synchronization signal; and
when the control module determines that the allocation signal is not received during the fourth period, the control module limits the power supply after the allocation signal is received by the communication module during a fifth period which is a period following the fourth period.

4. The device according to claim 1, wherein each of the plurality of second periods is a scheduled CSMA/CA period.

5. The device according to claim 1, wherein each radio wave has a directivity.

6. The device according to claim 5, wherein:
the control module is configured to determine whether a directivity in which a second communication device transmitting the allocation signal transmits the radio waves in a communication period preceding one of the plurality of second periods corresponds to a direction from the second communication device to the communication device; and
when the control module determines that (i) transmission and reception are not completed, and (ii) the directivity in which the second communication device transmits the radio waves in the communication period corresponds to the direction from the second communication device to the communication device, the control module supplies the power to the communication module during said one of the plurality of second periods so that the communication module can receive and transmit signals.

7. The device according to claim 6, wherein, when the control module determines that (i) the transmission and reception are not completed, and (ii) the directivity in which the second communication device transmits the radio waves in the communication period preceding the one of the plurality of second periods does not correspond to the direction from the second communication device to the communication device, the control module is configured to limit the power supply.

8. The device according to claim 5, wherein:
the allocation signal indicates a plurality of retransmission periods each being allocated to at least one of the plurality of communication devices;
the control module is configured to determine whether a directivity in which a second communication device transmitting the allocation signal transmits the radio waves in a communication period preceding one of the plurality of retransmission periods corresponds to a direction from the second communication device to the communication device; and
when the control module determines that (i) transmission and reception are not completed, and (ii) that the directivity in which the second communication device transmits the radio waves in the communication period corresponds to the direction from the second communication device to the communication device, the control module supplies the power to the communication module during the one of the plurality of retransmission periods so that the communication module can receive and transmit signals.

9. The device according to claim 8, wherein, when the control module determines that (i) the transmission and reception are not completed, and (ii) the directivity in which the second communication device transmits the radio waves in the communication period does not correspond to the direction from the second communication device to the communication device, the control module is configured to limit the power supply.

10. The device according to claim 1, further comprising an antenna, wherein the communication module is configured to receive and transmit the signals over the radio waves with the antenna.

11. A communication device comprising:
a communication module configured to receive and transmit signals over radio waves; and
a control module, wherein the control module is configured to:
control the communication module to send signals toward each of a plurality of sectors;
set a schedule including (i) a first period in which a transmission opportunity is allocated to a first communication device connected to the communication device and located in one of the plurality of sectors, and (ii) a second period in which the transmission opportunity is allocated to said one of the plurality of sectors, the second period being scheduled immediately after the first period; and
control the communication module to notify an allocation signal including information regarding the schedule to the first communication device.

12. The device according to claim 11, wherein the control module is further configured to:
set the schedule to further include a second first period in which the transmission opportunity is allocated to a second communication device allocated in the one of the plurality of sectors, said second first period being scheduled immediately before the first period; and
control the communication module to notify the allocation signal to the first communication device and the second communication device connected to the communication device; and
wherein in the second period, the transmission opportunity is allocated to the first communication device and the second communication device.

13. The device according to claim 12, wherein the control module is further configured to:
set the schedule to further include a third first period in which the transmission opportunity is allocated to a third communication device allocated in another one of the plurality of sectors, and
another second period in which the transmission opportunity is allocated to said another one of the plurality of sectors, said another second period being scheduled immediately after said third first period, and
notify the allocation signal to the first communication device, the second communication device, and the third communication device, connected to the communication device.

14. The device according to claim 13, wherein the control module is further configured to control the communication module to periodically transmit a synchronization signal toward the plurality of sectors.

15. The device according to claim 13, wherein the control module is configured to set the schedule to further include a CSMA/CA period.

16. The device according to claim 11, wherein the control module is further configured to:
- set the schedule to further include a second first period in which the transmission opportunity is allocated to a second communication device located in another one of the plurality of sectors, and
- another second period in which the transmission opportunity is allocated to said another one of the plurality of sectors, said another second period being scheduled immediately after the second first period; and
- control the communication module to notify the allocation signal to the first communication device and the second communication device, connected to the communication device.

17. A communication device comprising:
- a communication module configured to receive and transmit signals over radio waves; and
- a control module configured to:
  - control the communication module to send signals toward each of a plurality of sectors;
  - set a schedule including (i) a plurality of first periods in each of which a transmission opportunity is allocated to a corresponding one of a plurality of communication devices in a group, wherein the plurality of communication devices in the group are connected to the communication device and are located in one of the plurality of sectors, and (ii) a second period in which the transmission opportunity is allocated to the plurality of communication devices in the group, wherein the second period is scheduled immediately after the plurality of first periods; and
  - control the communication module to notify an allocation signal including information regarding the schedule to the plurality of communication devices.

18. The device according to claim 17, wherein the plurality of first periods are consecutive periods.

19. The device according to claim 17, wherein the control module is configured to control the communication module to periodically transmit a synchronization signal toward the plurality of sectors.

20. The device according to claim 17, wherein the control module is configured to set the schedule to further include a CSMA/CA period.

* * * * *